US010568463B2

(12) United States Patent
Stella et al.

(10) Patent No.: US 10,568,463 B2
(45) Date of Patent: Feb. 25, 2020

(54) FOOD SEPARATION UTENSIL

(71) Applicants: Anthony R. Stella, Porter Ranch, CA (US); Anthony W. Stella, Sherman Oaks, CA (US)

(72) Inventors: Anthony R. Stella, Porter Ranch, CA (US); Anthony W. Stella, Sherman Oaks, CA (US)

( * ) Notice: Subject to any disclaimer, the term of this patent is extended or adjusted under 35 U.S.C. 154(b) by 0 days.

(21) Appl. No.: 16/115,653

(22) Filed: Aug. 29, 2018

(65) Prior Publication Data
US 2019/0313858 A1 Oct. 17, 2019

Related U.S. Application Data

(60) Provisional application No. 62/656,790, filed on Apr. 12, 2018.

(51) Int. Cl.
*A47J 43/28* (2006.01)
(52) U.S. Cl.
CPC .................................. *A47J 43/28* (2013.01)
(58) Field of Classification Search
CPC ....... A47G 21/023; A47J 43/18; A47J 43/283; A01G 20/30; A01G 20/35; A01G 20/40
USPC .................................................. 294/61, 182
See application file for complete search history.

(56) References Cited

U.S. PATENT DOCUMENTS

| 1,993,314 | A | * | 3/1935 | Belford | A01D 11/00 294/61 |
| 4,422,681 | A | * | 12/1983 | Laroche | E01H 1/1206 294/1.4 |
| 4,856,835 | A | * | 8/1989 | Pacione | A47L 13/00 294/61 |
| 5,370,433 | A | * | 12/1994 | Yost | A01D 9/06 294/50.5 |
| 5,630,276 | A | * | 5/1997 | Weinstein | A47G 21/02 30/324 |
| 6,120,073 | A | * | 9/2000 | Jones | A01D 51/00 294/118 |
| 6,634,163 | B2 | * | 10/2003 | Kill | A01D 51/00 56/400.03 |
| 6,854,524 | B1 | * | 2/2005 | Williams | A01G 3/0435 171/5 |
| 7,159,810 | B1 | | 1/2007 | Miller | |
| 7,967,230 | B2 | | 6/2011 | Chapman et al. | |
| 8,083,168 | B2 | | 12/2011 | Park | |
| 8,806,759 | B2 | | 8/2014 | Cotter et al. | |
| 8,814,423 | B2 | | 8/2014 | Silvers et al. | |
| 9,506,208 | B2 | * | 11/2016 | Moorcroft | E01H 1/1206 |
| 2008/0022534 | A1 | * | 1/2008 | Kim | A47G 21/02 30/142 |
| 2014/0061346 | A1 | | 3/2014 | Rose | |

* cited by examiner

*Primary Examiner* — Stephen A Vu
(74) *Attorney, Agent, or Firm* — Global Intellectual Property Agency, LLC; Daniel Boudwin

(57) ABSTRACT

A food separation utensil. The food separation utensil includes an elongated member having a working end and a handle end. The working end has a base. The base includes two distinct groups of blades attached to a lower surface thereof. Both groups of blades are designed to separate and otherwise manipulate food products, such as ground meats and vegetables, in order to promote even cooking.

6 Claims, 3 Drawing Sheets

FOOD SEPARATION UTENSIL

CROSS REFERENCE TO RELATED APPLICATIONS

This application claims the benefit of U.S. Provisional Application No. 62/656,790 filed on Apr. 12, 2018. The above identified patent application is herein incorporated by reference in its entirety to provide continuity of disclosure.

BACKGROUND OF THE INVENTION

The present invention relates to a food separation utensil. Ground meats, such as hamburger, ground poultry and sausage are staples in many culinary environments. These foods, while cooking, may adhere to themselves. When this occurs, both the taste and texture of a dish may be altered. Furthermore, certain ground meats, such as ground chicken and pork, may need to be thoroughly cooked in order to kill any potentially dangerous bacteria.

Traditionally, tools for breaking apart foods, such as ground meats are electrical. Electrical devices require access to a power source, which is typically an outlet. While cooking, it may be inconvenient for a user to locate an outlet. Furthermore, plugging a device into an outlet inherently limits the movement of the device as well as provides an electrical cord which could become tangled and lead to accidents in a kitchen.

Furthermore, known manual devices are ineffective in enabling a user to fully control the texture and consistency of the food product. Additionally, a type of manual food separation utensil commonly referred to as a "masher" frequently fails to adequately separate food while simultaneously preventing the "overmashing" of the food products. Overmashing occurs where the manual utensil does not provide sufficient space for the food product during separation, and the texture and consistency becomes too viscous or finely broken down such as to be undesirable for a user.

Thus, there is a need amongst the known food separation devices for a new device that provides both improved mobility and flexibility to a user when separating food products for cooking, while additionally preventing the "overmashing" of the food product. In light of this need, the present invention provides a food separation utensil that includes two distinct blade configurations to increase the amount of control provided to a user when separating food products, such as ground meats and vegetables, in order to achieve a desired texture and consistency.

SUMMARY OF THE INVENTION

In view of the foregoing disadvantages inherent in the known types of food separation utensils now present in the known art, the present invention provides a food separation utensil wherein the same can be utilized for providing convenience for the user when separating food.

The present system comprises an elongated member including a working end disposed oppositely a handle end. The working end comprises a base. The base comprises a plurality of primary blades disposed on a lower side thereof. The plurality of primary blades is disposed around a perimeter of the base. Additionally, a plurality of secondary blades disposed on a lower side of the base extend radially inward toward a central point of the base.

In another embodiment, the food separation utensil comprises a gripping surface on the handle end of the elongated member, such that stability is provided to a user when utilizing the food separation utensil.

In a further embodiment, the gripping surface of the handle end of the elongated member is secured to the elongated member by an upper ring and a lower ring disposed around the elongated member. The upper ring and the lower ring maintain the position of the gripping surface and provide stability to a user when utilizing the food separation utensil.

In yet another embodiment, the plurality of primary blades is defined by a plurality of flat outward extensions, wherein the flat outward extensions include a sharpened edge. The flat outward extensions provide convenience to a user wherein the flat outward extensions are configured to chop and separate food products.

In yet a further embodiment, the plurality of secondary blades is defined by a plurality of spikes, wherein each spike includes a point extending outward from the lower side of the base of the working end of the elongated member. The plurality of spikes provides convenience to a user wherein the spikes are configured to pierce food products and assist in the separation thereof.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
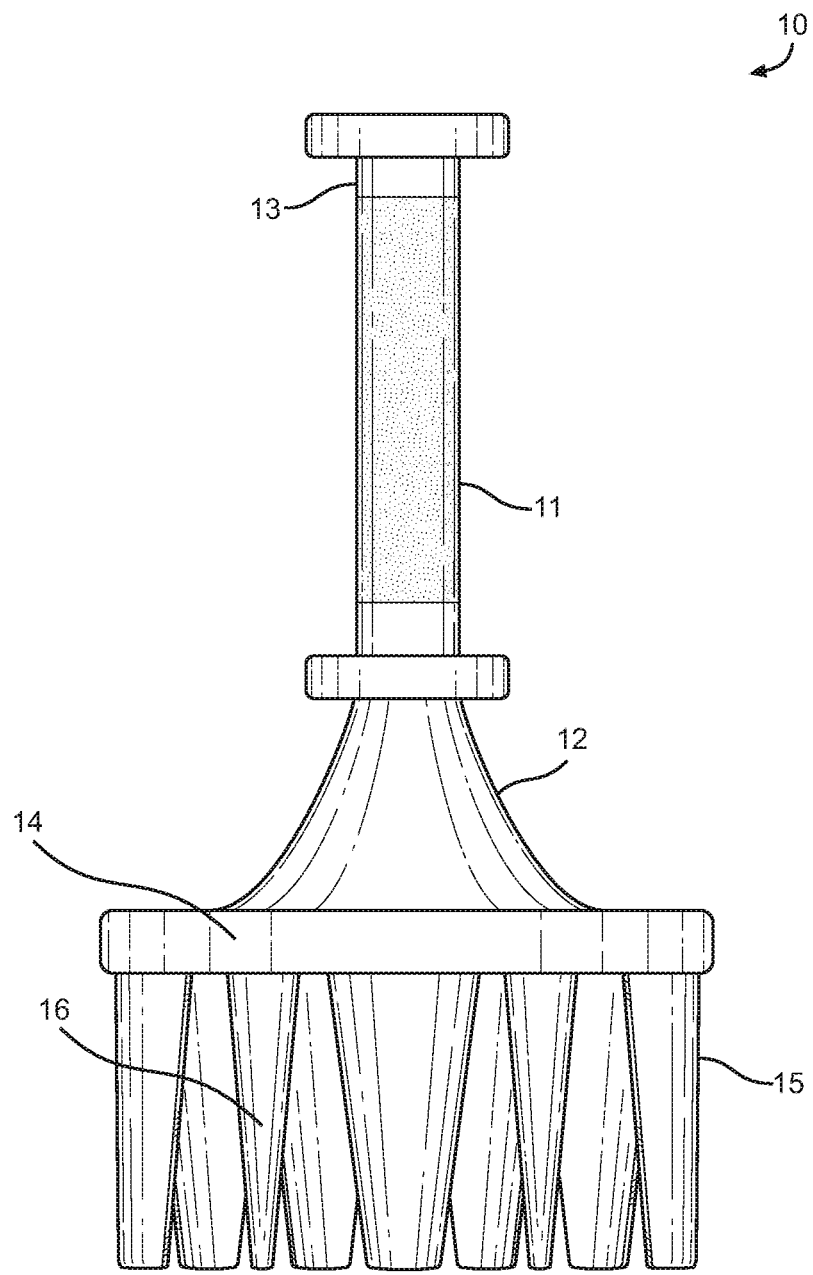
FIG. 1 shows a side elevation view of an embodiment of the food separation utensil.

Reference is made herein to the attached drawings. Like reference numerals are used throughout the drawings to depict like or similar elements of the food separation utensil. The figures are intended for representative purposes only and should not be considered to be limiting in any respect.

Referring now to FIG. 1, there is shown a side elevation view of an embodiment of the food separation utensil. The food separation utensil 10 comprises an elongated member 11 having a working end 12 disposed oppositely a handle end 13. In the shown embodiment, the elongated member 11 is tubular. The tubular shape of the elongated member 11 allows a user to comfortably hold the food separation utensil 10.

In the shown embodiment, the food separation utensil 10 is of a unitary construction that includes no separable parts. When the food separation utensil 10 is entirely unitary, convenience is provided to the user as the device will not separate, or fall apart, while in use. Additionally, the unitary construction of the food separation utensil 10 provides convenience to a user when cleaning the utensil. Additionally, the food separation utensil 10 is made of a rigid material, such the food separation utensil 10 can adequately separate, or break up, a food product to achieve a desired texture and consistency.

The working end 12 comprises a base 14. In the shown embodiment, the working end 12 of the elongated member 11 tapers outwardly to receive the base 14, such that pressure may be evenly divided across an entire surface of the base 14. Additionally, the base 14 comprises a plurality of primary blades 15 and a plurality of secondary blades 16 thereon. In the shown embodiment, the base 14 is of a tubular configuration and provides a circular lower surface from which the plurality of primary blades 15 and the plurality of secondary blades 16 extend.

The plurality of primary blades 15 and the plurality of secondary blades 16 are each configured to separate food products. In one embodiment, the plurality of primary blades 15 and the plurality of secondary blades 16 are coated in a non-stick substance, such as to prevent particles of food from sticking while the food separation utensil 10 is in use. The non-stick substance is any substance configured to prevent particles of food from sticking to the plurality of primary blades 15 and the plurality of secondary blades 16.

Figure 2:
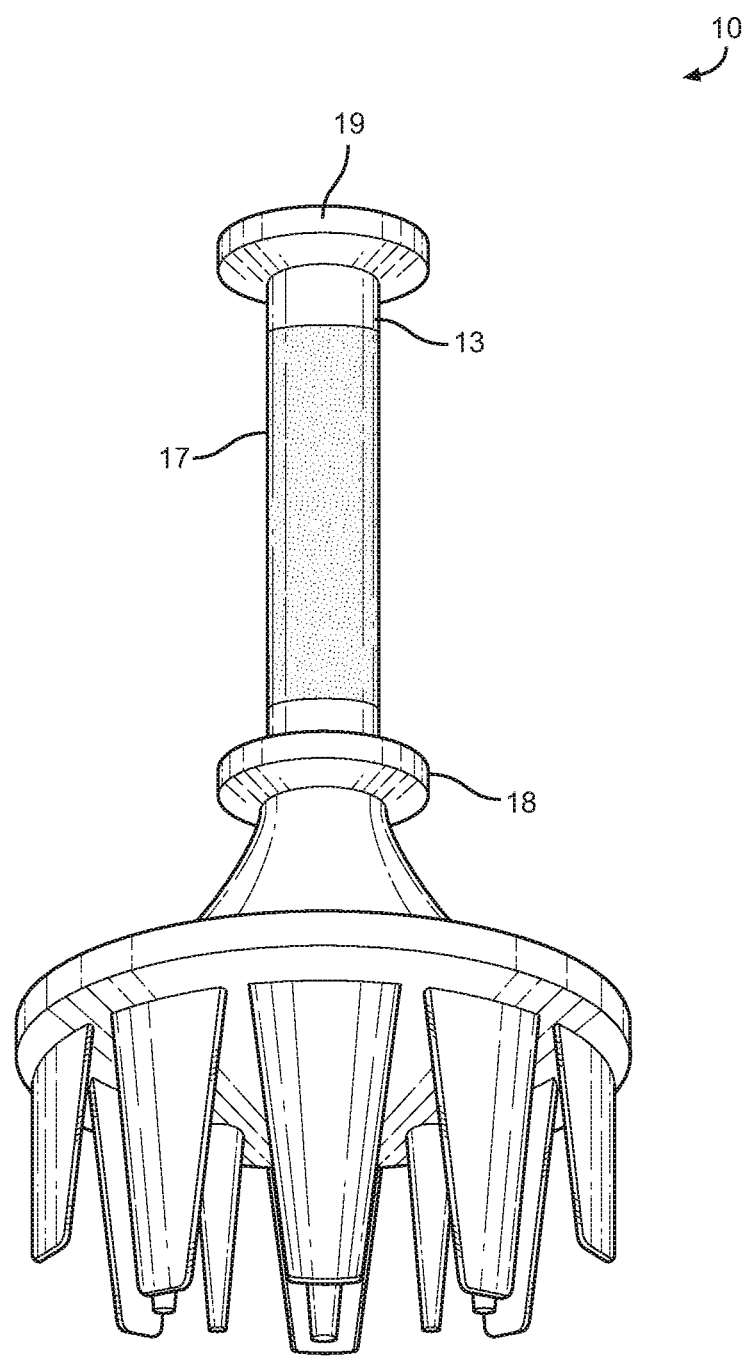
FIG. 2 shows a perspective view of an embodiment of the food separation utensil.

Referring now to FIG. 2, there is shown a perspective view of an embodiment of the food separation utensil. In the shown embodiment, the handle end 13 comprises a gripping surface 17 thereon. The gripping surface 17 provides security to a user when using the food separation utensil 10. In one embodiment, the gripping surface 17 is rubberized.

Furthermore, in the shown embodiment, the elongated member 11 comprises a lower ring 18 and an upper ring 19. The lower ring 18 and the upper ring 19 extend from the elongated member 11 to receive a hand of the user therebetween. The lower ring 18 and the upper ring 19 provide ease of use to the user and prevent the hand of a user from sliding along the elongated member 11 while using the food separation utensil 10.

Figure 3:
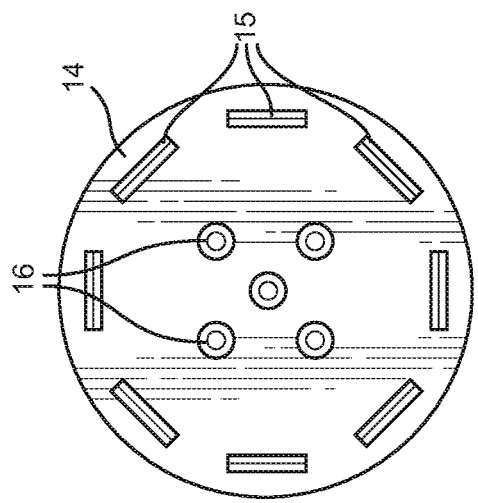
FIG. 3 shows a bottom plan view of an embodiment of the food separation utensil.

Referring now to FIG. 3, there is shown a bottom plan view of an embodiment of the food separation utensil. The base 14 comprises a plurality of primary blades 15 and a plurality of secondary blades 16 extending outwardly therefrom. The configuration of the plurality of primary blades 15 and the plurality of secondary blades 16 is configured to provide adequate spacing to prevent overmashing.

The plurality of primary blades 15 is disposed around a perimeter of the base 14. In the shown embodiment, the plurality of primary blades 15 is defined by a plurality of flat outward extensions, wherein each flat outward extension provides a sharpened edge. Additionally, as shown, the flat outward extensions are oriented such that the linear axis defined by each sharpened edge is parallel to a linear axis defined by each corresponding sharpened edge. In another embodiment, the plurality of primary blades 15 are curved identically to the base 14. In the shown embodiment, a width of each primary blade 15 tapers inwardly from the base 14 to a free end thereof, wherein the free end terminates in the sharpened edge.

The plurality of secondary blades 16 extends radially inward toward a central point 20. In the shown embodiment, the plurality of secondary blades 16 is defined by a plurality of spikes. Each spike of the plurality of spikes defines a point extending outward from the base 14 of the working end of the elongated member. Additionally, in the shown embodiment, the plurality of secondary blades 16 comprises a spike directly disposed over the central point 20 of the base 14. In the shown embodiment, each secondary blade 16 includes a conical configuration.

Figure 4:
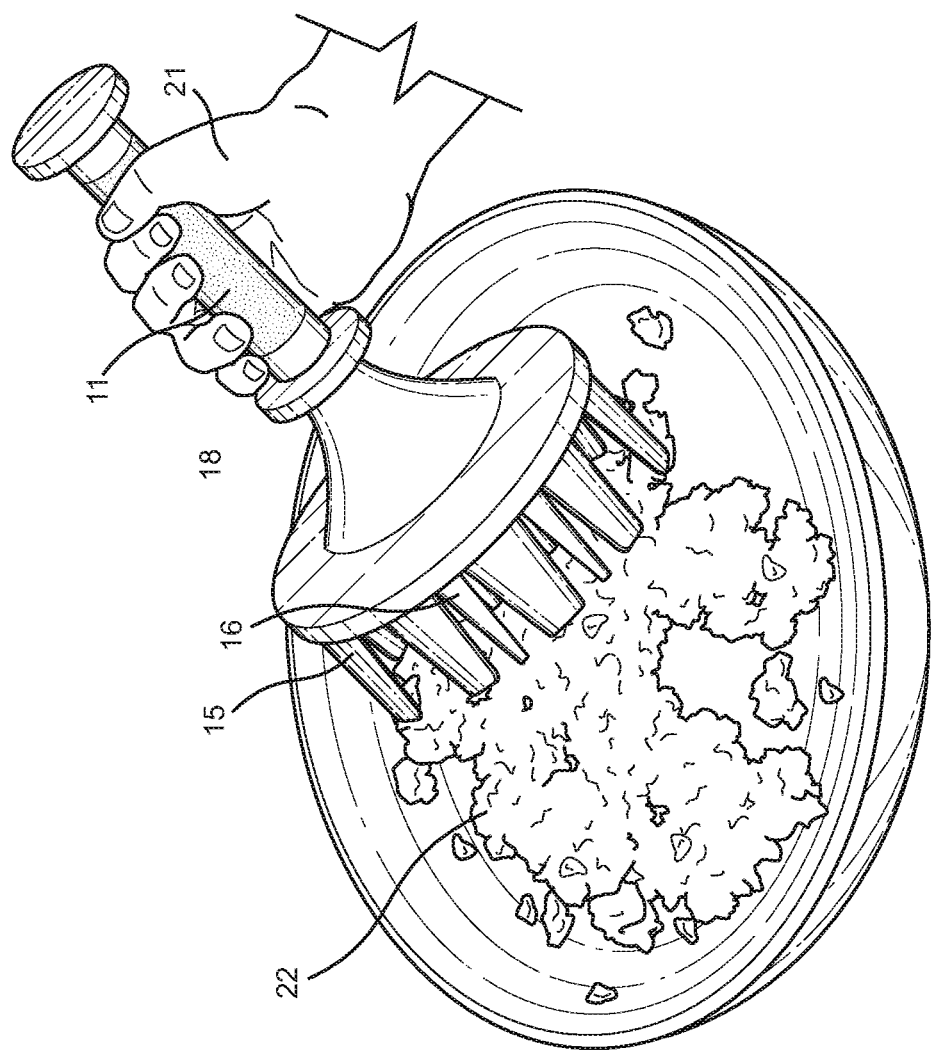
FIG. 4 shows a perspective view of an embodiment of the food separation utensil in use.

Referring now to FIG. 4, there is shown a perspective view of an embodiment of the food separation utensil in use. In use, a user 21 may grip the elongated member 11 at the handle end. In the shown embodiment, the user 21 is gripping the elongated member 11 between the lower ring and the upper ring. While gripping the elongated member 11, the user 21 may engage a food product 22 with the working end 12 of the elongated member 11. When engaging the food product 22, the plurality of primary blades 15 may be utilized to slice, chop or otherwise separate the food product 22. Additionally, the plurality of secondary blades 16 may be utilized to tenderize, stir, or otherwise manipulate the food product 22.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A food separation utensil, comprising:
an elongated member having a working end and a handle end;
the working end comprising a base;
the base comprising a plurality of primary blades disposed around a perimeter of the base;
a plurality of secondary blades extending radially inward toward a central point;
wherein the plurality of primary blades each define a first shape;
wherein the first shape is a flat outward extension defining a sharpened edge at an end of the flat outward extension;
wherein the plurality of secondary blades each define a second shape;
wherein the second shape is a conical spike having a decreasing diameter from the base to a tip of the conical spike;
wherein the first shape is distinct from the second shape;
the handle end further comprising an upper ring and a lower ring disposed adjacent opposing ends of a gripping surface on the handle end;
the upper ring and the lower ring in parallel, longitudinal alignment;
the elongated member tapering outward between the lower ring and the base.

2. The food separation utensil of claim 1, wherein the plurality of secondary blades are spikes.

3. The food separation utensil of claim 1, wherein the food separation utensil is a single solid piece.

4. The food separation utensil of claim 1, wherein the plurality of primary blades and the plurality of secondary blades comprise a non-stick substance disposed thereon.

5. The food separation utensil of claim 1, wherein the working end of the elongated member tapers outwardly to receive the base.

6. The food separation utensil of claim 1, wherein a width of each of the primary blades tapers inwardly from the base to a free end thereof, wherein the free end terminates in the sharpened edge.

\* \* \* \* \*